March 29, 1966  D. H. DICKSTEIN ETAL  3,243,143
DOUBLY STABILIZED SATELLITE
Filed Nov. 27, 1962
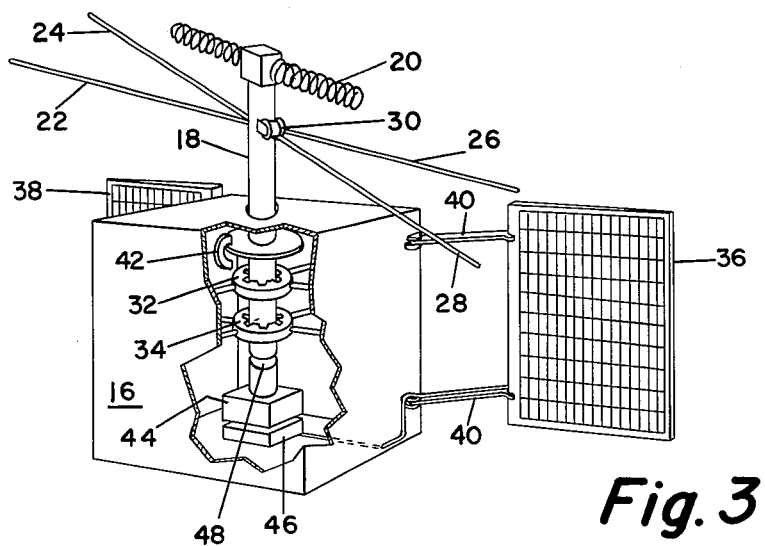
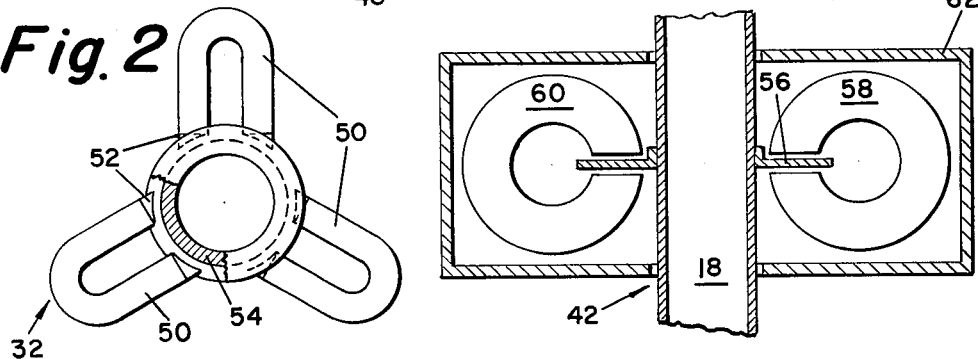
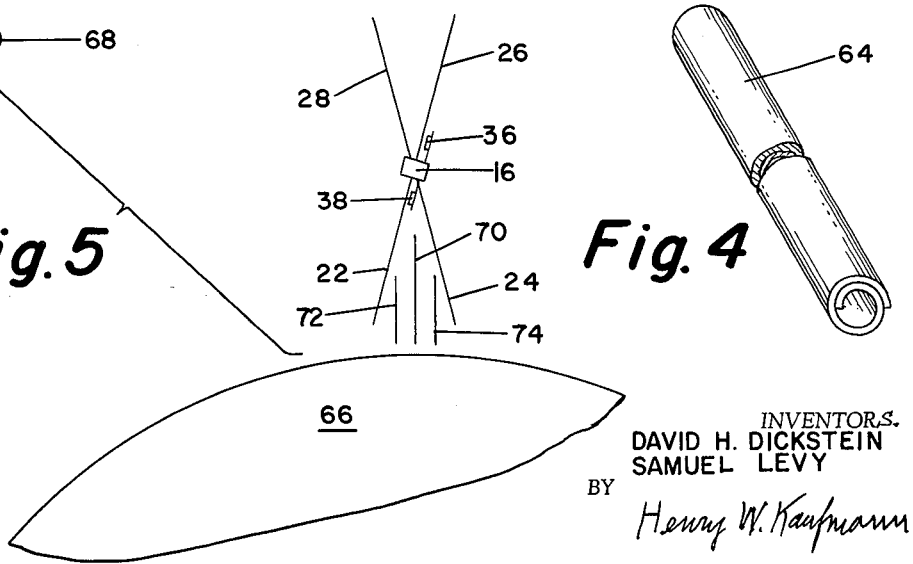
INVENTORS.
DAVID H. DICKSTEIN
SAMUEL LEVY
BY
Henry W. Kaufmann
AGENT March 29, 1966 D. H. DICKSTEIN ETAL 3,243,143
DOUBLY STABILIZED SATELLITE
Filed Nov. 27, 1962
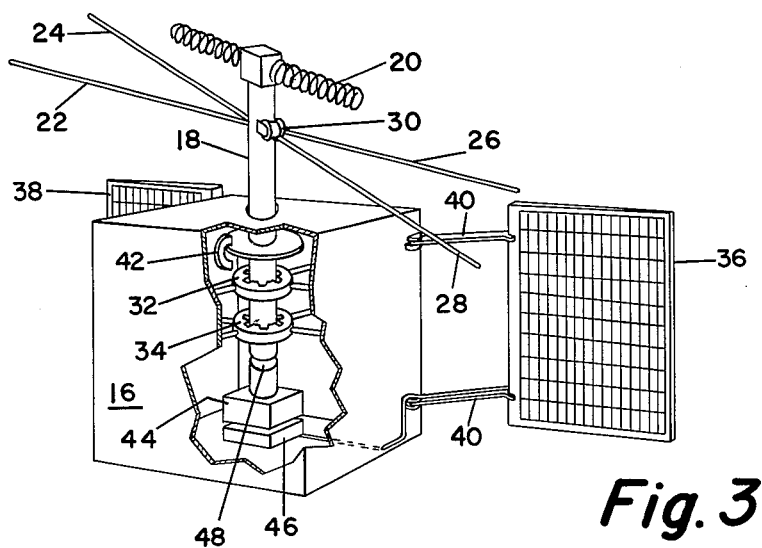
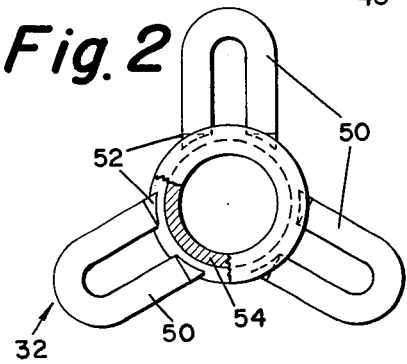
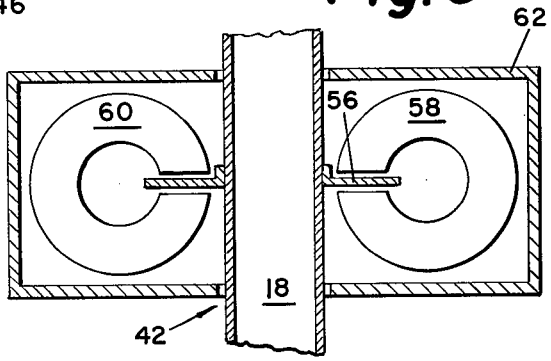
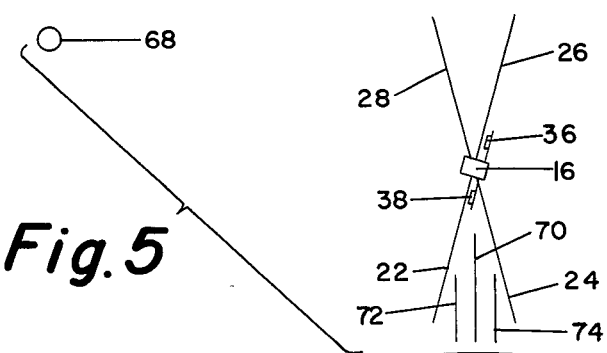
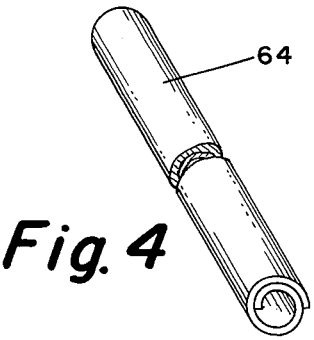
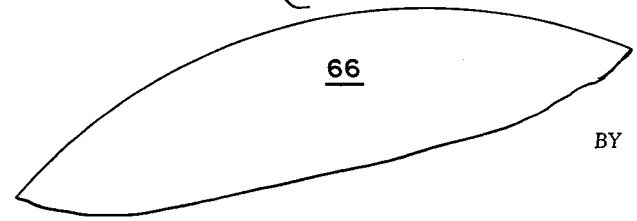
INVENTORS.
DAVID H. DICKSTEIN
SAMUEL LEVY
BY
Henry W. Kaufmann
AGENT United States Patent Office 3,243,143
Patented Mar. 29, 1966

3,243,143
DOUBLY STABILIZED SATELLITE
David H. Dickstein, Philadelphia, Pa., and Samuel Levy, Schenectady, N.Y., assignors to General Electric Company, a corporation of New York
Filed Nov. 27, 1962, Ser. No. 240,385
3 Claims. (Cl. 244—1)

This invention pertains to space satellites, and more particularly to their stabilization.

It is known to stabilize satellites, e.g. of bodies such as the earth, with respect to the central body, or with respect to another body such as the sun. Stabilization with respect to the central body (hereinafter, for brevity and convenience to be designated simply as "earth") is desirable for devices which carry directional antennas which it is desired to maintain oriented toward the earth, or for devices bearing cameras or other observing devices which have directional characteristics. Devices requiring the sun's radiation as a source of energy ordinarily require stabilization with respect to the sun. As a practical matter, it is usual to provide a major vehicle (such as a communication relay satellite) with means for orientation toward the earth, and to provide as excrescences on the major vehicle panels of energy converters which are oriented toward the sun. Conventional orientation or stabilization devices are reaction devices, such as gas jets or flywheels, whose operation is controlled either by sensors of solar radiation (for solar orientation) or by sensors of the terrestrial infrared radiation (for orientation toward the earth). Such systems may be provided with sufficiently fast and well-controlled reaction devices to achieve rapid adequate damping of oscillations which may occur when the vehicle is first put into orbit. However, these schemes have the disadvantage that they require the jettisoning of mass of some kind from the vehicle, and thus can provide only a limited period of operation between replenishments of the mass supply. It is known to use the radiation pressure from the sun to orient a vehicle with respect to the source of radiation, and it is also known to use the gradient of the earth's gravitational field to orient a vehicle with respect to the earth. However, the use of either of these schemes has the appreciable disadvantage that there is no provision for damping the initial oscillations of the vehicle. (Reference: Paper 61-179-1873, Proceedings of National Joint Meeting of Institute of Aeronautical Sciences and American Rocket Society, June 13-16, 1961; distributed by American Rocket Society, 500 Fifth Ave., New York 36, N.Y.)

It has occurred to us that a combination of gravity gradient and radiation pressure means may profitably be employed to achieve desired orientation of two different parts of a space vehicle, the first part being of such nature (e.g. an antenna) that its attitude toward the earth is most important to control, the second part being maintained in attitude toward the source of radiation, either deliberately or by natural tendency of the design. We connect these two vehicle parts by a low-friction-torque coupling, to permit them to orient themselves independently in accordance with the torques provided by their several orientation means; but we also provide a damping device (such as an eddy current brake) to damp out any oscillations between the two parts. Thus we make use of the availability of two different sources of torque to utilize each part of the space vehicle to damp out oscillations in the other part, whether initial or arising in orbit.

Generally, we achieve orientation and damping of a space vehicle by the use of two independent sources of torque acting upon two different parts of the vehicle. This object is a desirable one, and in achieving it we achieve certain other desirable results, such as keeping a part of the vehicle fixed in attitude toward the earth, while another part of the vehicle is fixed in attitude toward the sun.

For the better understanding of our invention we have provided figures of drawing, in which FIG. 1 represents pictorially, and partly in section, an embodiment of our invention;

FIG. 2 represents a detail of a magnetic bearing useful in the practice of our invention;

FIG. 3 represents a detail of a damping device useful in the practice of our invention;

FIG. 4 represents a portion of an erectile device useful in the practice of our invention; and FIG. 5 represents a vehicle in accordance with our invention in orbit around the earth.

FIG. 1 represents a satellite vehicle having an exterior housing 16, here represented as partly sectioned away to disclose elements in its interior. Protruding from the case or housing 16 is a mast 18 which bears at its end a helical antenna 20. Represented as protruding from the mast 18, lying in a plane normal to the axis of mast 18, are four members 22, 24, 26, and 28 which will be designated as "rods" because their function in this embodiment is essentially identical with that which would be performed by a solid rod. Actually, however, these members are erectile strips of elastic material which have a permanent set of tthe geometry indicated by their representation in FIG. 1, but can be rolled up on a reel of much smaller dimensions and retained thus provided they are restrained against extension. Reel 30, from which rod 28 protrudes, is the only such reel represented in FIG. 1, because the reels from which rods 22, 24, and 26 might extend would be concealed by the mast 18 or by reel 30 itself. However, in the embodiment all the rods may conveniently be rolled up on reels during the period of entry of the vehicle into orbit, and may then be releasably by removal of whatever restraint previously prevented them from unrolling. This restraint may be a mechanical latch releasable by a time-operated device, or controllable by radio signal; or it may be a bonding adhesive which sublimes away at the low pressures found in orbit. In the particular embodiment under consideration, rods 22, 24, 26, and 28 are of equal lengths, 150 feet, and weigh about 1.5 pounds per hundred feet, or about 2.25 pounds each.

Mast 18 is maintained in its orientation with respect to case 16 by bearings 32 and 34. These are preferably magnetic bearings, or other type of bearing suitable for operation in the space environment and having no or very low static torque. FIG. 2 (to be discussed hereinafter), represents in more detail a type of bearing suitable for the practice of our present invention. Paddles 36 and 38 are represented as extending from case 16 upon arms 40 which are contrived in any desired manner to permit extension of panels 36 and 38, after entry into orbit, from a position folded flat against housing 16, or actually entered into housing 16. A magnetic damping device, which may consist simply of a conventional eddy-current brake, is represented at 42; its function is to provide dissipative damping of the relative motion between mast 18 and housing 16. For actual use in the vicinity of any parent body having a circumambient magnetic field, any embodiment of damper 42 incorporating devices producing a magnetic field must be surrounded by a high-permeability shield to prevent interaction between the magnetic field from the damper and that from the parent body. Such a shield is in fact shown in FIG. 3, to be described in more detail hereinafter, but is not represented here in FIG. 1 because it would impair clarity.

Mounted inside housing 16 there are represented a cabinet or chassis 44 containing suitable radio apparatus for coupling to antenna 20, and a second cabinet or chassis 46, containing suitable power supply equipment. These representations are primarily for completeness. The art of providing power supplies for satellite space vehicles, and the art of providing radio equipment for them, are both well known, voluminous, and inclusive of many variations. Restriction of this description to a particular form or type of either radio apparatus or power supply equipment would be pointless to absurdity. For long periods of operation it may be convenient to provide 36 and 38 with a covering of photovoltaic cells to convert into electrical energy the solar radiation incident upon them, and to provide in cabinet 46 apparatus to receive, store, and convert such electrical energy; but this is not mandatory. At 48 there is represented a rotary joint which may be of any of the well-known rotating joints for transmission of radio-frequency energy between two mutually movable channels. For the frequencies ordinarily used in space vehicle communications, waveguide joints are convenient; but for lower frequencies, it may be convenient to employ simply two coaxial inductors mutually coupled.

FIG. 2 represents schematically one particular form of a number of possible magnetic bearings. This particular embodiment is of interest because it requires no external source of energy, and because models tested have been found to have the characteristics required for utility in the practice of our invention. Permanent magnets (three are shown, but the number is a matter of design convenience) 50 are provided with magnetically soft pole shoes 52 to provide a magnetic field in close proximity to the outer surface of a cylindrical ring 54. Mounting means for the magnets 50 are not shown, since these may be of any convenient kind adapted to hold the magnets 50 fixed with respect to one another and to secure them rigidly with respect to the case or housing 16. Pole shoes 52 are represented as a convenient way of applying the flux produced by magnets 50; but it is obvious that it would be possible to finish magnets 50 accurately to the shape of pole shoes 52, in which case the pole shoes 52 could be eliminated, being replaced by the shaped ends of magnets 50. Ring 54 is of some diamagnetic material, i.e., a material having a permeability less than unity and thus, by ancient art, tending to be repelled by a magnet, or (alternatively) to move from a strong magnetic field to a weak one. In use, ring 54 will surround mast 18. Bismuth is the most strongly diamagnetic material known, and is preferred for the material of ring 54. Even the use of bismuth is sufficient to provide only relatively weak repulsive forces; but the application of a bearing according to FIG. 2 in the practice of our invention is only to maintain relative position of masses in a condition of free fall, subject additionally to relatively weak torques from the pressure of solar radiation and from the gradient of gravity—that is, from the difference in the values of $g$ at different parts of the space vehicle. These are all sufficiently small so that the small load capacity of a bearing according to FIG. 2 will suffice. The bismuth, being electrically conductive, will, when it moves, suffer the induction of eddy currents in it and thus will be damped *dynamically*; but it has no identifiable minimum starting torque, or static torque, which must be exceeded to start it moving. It is this characteristic which is useful for the functioning of our invention, since a bearing which had a minimum starting torque greater than the torque applied by the sources indicated in this paragraph would, for the purposes of our invention, be the equivalent of a rigid connection rather than a bearing. If the displacement of the bearing during the preorbital life of the vehicle is objectionable, the bearing clearance space may be filled with some material, such as an organic solid, which will sublime off under the very low pressures of space, so that the bearing will be freed for rotation only after the vehicle has been placed in orbit. The magnets 50 will, of course, interact with any ambient magnetic field (such as that from the central body or earth), and apply undesired torques to the vehicle. This may be eliminated by shielding the entire assembly by a shield of magnetically soft, high-permeability material (such, for example, as the alloy known commercially as "Mumetal").

Magnetic bearings other than the static-field type hereinabove described are known in the art. A reference to magnetic bearings employing alternating fields is "A Magnetic Support for Floated Inertial Instruments" by P. J. Gilinson, W. G. Denhard, and R. M. Frazier, Sherman M. Fairchild Publication Fund Paper No. FF-27 of the Institute of Aeronautical Sciences, 2 East 64th Street, New York City 21, Borough of Manhattan, New York County, State of New York, U.S.A., presented at the IAS National Specialists Meeting on Guidance of Aerospace Vehicles, May 25–27, 1960. This is a 126-page treatise on the design, use, and characteristics of repulsion-type-A.-C. powered magnetic bearings. Such bearings are also applicable in the practice of our invention, but have the characteristic that they require a supply of electrical energy to permit them to function; this may be objectionable in some cases, but where it is not the A.-C. powered bearings have the advantage of providing much greater load capacity for a given physical size.

FIG. 3 represents in section a damping device which may be applied to provide damping in addition to that provided by the eddy-current losses of the bearing represented in FIG. 2. Mast 18 is provided with a (56) collar of disk shape, made of electrically conductive material. Permanent magnets 58 and 60 are mounted by means not represented rigidly with respect to the housing 16, providing flux through the ring 56, so that its rotation will induce eddy currents in it precisely like the well-known drag disk in the standard watthour meter. A high-permeability shield 62 is represented mounted to shield the entire assembly, except for the place where the mast 18 passes through it. If necessary, mast 18 could be provided with a high-permeability sleeve to complete the shielding by short-circuiting any flux across the openings in shield 62. This general shielding scheme is also applicable to the shielding of the bearing represented in FIG. 2.

FIG. 4 represents, for completeness, a part of the erectile material used to form rods 22, 24, 26, 28. As the representation clearly indicates, it is a formed strip of elastic material 64. It is believed clearly understandable by ordinary mechanical intuition that such a strip can be deformed elastically by being rolled up upon a reel in the form of a flat pancake cylinder, and may be unreeled at need to form the structure represented. Such devices as this are sold commercially by the De Havilland Aircraft Company of Toronto, P. Ontario, Canada. A suitable form for purposes of our invention is made by beryllium copper strip 0.002 inch thick and two inches wide.

The essentials of an embodiment of our invention having been described, the mode of operation may be described relatively simply, with reference particularly to FIG. 5. In FIG. 5 the vehicle of FIG. 1 is represented on a much reduced scale, showing it in orbit above an earth 66, in the presence of a sun 68. Rods 22, 24, 26, and 28 are represented extended. To simplify very much: the earth's gravitational field is inversely proportional to the square of the distance from the earth's center of mass to the point where the field is measured; therefore, the farther from the earth's center of mass one moves, the smaller will be the force upon a given mass. Therefore, the earth's gravitational force upon rods 22 and 24 will be greater than that upon rods 28 and 26, which are farther away from the earth. Now, it is true that the satellite space vehicle, when in orbit, is falling freely under the pull of gravity at all times; but it is the center of mass of the vehicle whose path is that of a freely falling body at the particular altitude of the center of mass of the vehicle. If the rods 22 and 24 were free of the vehicle, they would fall faster than the vehicle, because their individual centers of mass are at a lower altitude; so rods 22 and 24 actually pull downward upon the vehicle even though the vehicle *as a whole* is falling freely and "weightless." For the same general reason, rods 28 and 26, if separate from the vehicle, would fall more slowly than the vehicle, because their individual centers of mass are at a higher altitude than the vehicle's center of mass. Therefore, they are dragged reluctantly downward by the vehicle, and produce a reaction which appears as an upward pull upon the vehicle. These combined actions, the downward pull of rods 22 and 24, and the upward pull of rods 28 and 26, produces a self-stabilizing situation in which a slight angular rotation of the rod system which would displace it from the position shown would create moment arms such that the reactions of the rods would tend to restore the vehicle to the orientation represented, in which rods 22 and 24 point symmetrically downward, and rods 28 and 26 point symmetrically upward; that is, the bisector of the angle between rods 22 and 24 (which in the present embodiment is thirty degrees) and the bisector of the angle between rods 28 and 26 (also thirty degrees) both point along the local vertical.

Housing 16, in FIG. 5, is represented as so oriented that its solar paddles 36 and 38 are turned normal to sun 68, by the action of solar pressure upon the paddles, which are located behind the center of mass of housing 16 and its contents so that pressure upon paddles 36 and 38 tends to orient them symmetrically, normal to the source of radiation. It will be observed that this orientation of the rods and the housing differs from their orientation represented in FIG. 1, and can be achieved only by rotation on the bearings 32.

The absence of air friction or other energy dissipants would permit either a gravity-gradient oriented system or a radiation-pressure oriented system to oscillate for an indefinitely long period. It has occurred to us that, where there are available two (or more) separate, independent, sources of torque, with respect to which two separate portions of the vehicle may be oriented, by coupling them together in such fashion that they are dynamically damped with respect to each other, but have negligible constant frictional or locking torque between them, the dynamic damping may be employed to damp oscillations in either or both portions of the system. The only condition under which such damping could fail to achieve this result would be the highly improbable (and easily avoided) one that the natural period of both portions of the system were the same.

It may also be shown by considering the centripetal acceleration of the centers of mass of the rods that the pull of gravity will cause them to turn so as to stabilize the vehicle with the plane of the rods in the orbital plane. Referring to FIG. 5, if it be assumed for the present purpose that the vehicle is rotating in an orbit directed toward the observer, it is evident that the orbital plane whose trace it designated as 70, passing through the center of mass of the vehicle as a whole, will also pass through the center of mass of the earth. The centers of mass of rods 22 and 28, and of 24 and 26, will lie in planes whose traces are designated, respectively as 72 and 74. These planes will evidently be parallel to the plane whose trace is 70, and will, therefore, not pass through the center of mass of the earth. But the centripetal accelerations of the centers of mass of the rods will lie in the planes whose traces are 72 and 74. However, the gravitational pull upon the centers of mass of the rods will not lie in those planes, but will be directed toward the center of mass of the earth, leaving gravitational force components which are not expended in producing centripetal accelerations of the centers of mass of the rods. These otherwise unexpended force components will evidently be horizontal and will be directed inwardly toward the orbital plane whose trace is 70. They will therefore tend to cause the vehicle to turn so the rods will lie in the orbital plane. It is thus evident that if the vehicle were actually in an orbit directed toward the observer, it would be in an unstable condition, and only an orbit in the plane of FIG. 5 would actually be stable. Since, in the general case, oscillations in yaw, i.e., in a plane normal to the orbital plane and to the local vertical, will require the housing 16 to rotate with respect to the rods 22, 24, 26, and 28, in response to the effects of solar radiation pressure upon paddles 36 and 38, the damping provided either by bearings 32 and 34 or by damper 42, or all, will dissipate also the energy in the yaw mode of oscillation. The vehicle will thus have its separately movable parts oriented with respect to the radiation source and the source of gravitational pull, respectively, with all modes of oscillation damped. This will produce stable orientation, after a sufficient time for the dissipation of the energy stored in the various modes.

It is apparent that if it were required that a third part of the vehicle be free to orient itself with respect to some other field, for example, a magnetic field, that third part could be attached by negligible-friction bearings to the vehicle, could be provided with dynamic damping means to damp its oscillations with respect to the rest of the vehicle, and would cooperate with the other two separately movable parts of the vehicle in exactly the same way as they cooperate with each other to permit each other to orient themselves according to separate, different criteria, and yet damp each other's oscillations.

What is claimed is:

1. A satellite vehicle comprising:
   a housing containing power equipment, radio equipment, and provided with solar paddles adapted to receive radiant energy and to orient the said housing responsively to the pressure of the said radiant energy upon the said solar paddles;
   an antenna-carrying assembly provided with four erectile rods located in a common plane and extending in different directions from the said antenna-carrying assembly to orient the said assembly responsively to the ambient gravitational field;
   bearing and damping means rotatably connecting the said housing and the said antenna-carrying assembly, the said bearing means having negligible static torque.

2. A satellite vehicle comprising:
   a first part provided with means for receiving radiation and orienting the said first part responsively to the pressure of the said radiation upon the said means;
   a second part provided with means for orienting the said second part responsively to the direction of the gradient of the local gravitational field;
   connecting and damping means rotatably connecting the said first and second parts.

3. A space vehicle comprising:
   a first part provided with means for receiving the force of a first external force field, said force directly orienting the said first part responsively thereto;
   a second part provided with means for receiving the force of a second external force field, said last mentioned force directly orienting the said second part responsively thereto;
   means to pivotally connect the two parts;
   damping means connected between the said first part and the said second part to damp relative motion between the said two parts.

References Cited by the Examiner

UNITED STATES PATENTS 3,031,154  4/1962  Roberson et al. _____ 244—1
3,116,035  12/1963  Cutler _____ 244—1
3,116,484  12/1963  Cutler _____ 244—1

FERGUS S. MIDDLETON, *Primary Examiner.*

MILTON BUCHLER, *Examiner.*